Figure 1:
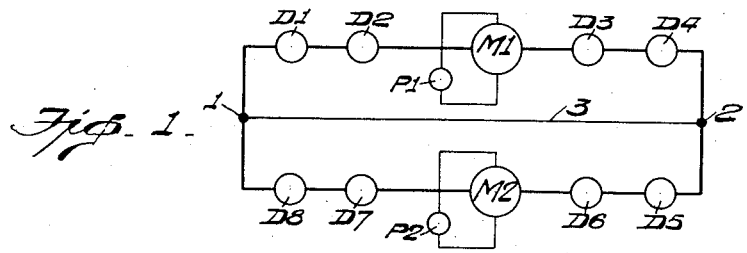

Feb. 9, 1937.  G. M. PESTARINI  2,070,450
DIRECT ELECTRIC GENERATOR AND TRANSFORMER
AND CIRCUIT ARRANGEMENT THEREFOR
Filed May 2, 1934  3 Sheets-Sheet 1

Inventor
GIUSEPPE M. PESTARINI
By
Attorneys

Inventor
GIUSEPPE M. PESTARINI
By Norris & Bateman
Attorneys

Patented Feb. 9, 1937

2,070,450

UNITED STATES PATENT OFFICE 2,070,450

DIRECT ELECTRIC GENERATOR AND TRANSFORMER AND CIRCUIT ARRANGEMENT THEREFOR

Giuseppe M. Pestarini, Sheffield, England

Application May 2, 1934, Serial No. 723,569
In Great Britain April 28, 1933

15 Claims.  (Cl. 172—239)

This invention relates to direct electric current generating units such as dynamo electric machines or motor generators or continuous current transformers adapted to supply a constant current with variable voltage and to circuit arrangements in which such generating units are employed.

In a constant current series circuit the voltage across any part of the circuit is a measure of the load either generated or absorbed in that part of the circuit and the object of the present invention is to provide improved systems of distribution or circuit arrangements whereby when a number of generating units of the kind above referred to are connected in series with each other and a number of consuming devices forming a load, each unit will provide such a proportion of the total voltage required by the entire consuming load in the circuit as will correspond to the size or output for which such generating unit is designed.

The invention will be described with reference to what are known as metadyne generators and metadyne transformers, but it will be understood that it is applicable to constant direct electric current generators or transformers of other types.

A metadyne transformer is a rotary apparatus which is designed to transform electric power supplied to it at a fixed voltage and variable amperes into electric power at constant amperes and variable voltage. The apparatus comprises in general a rotor provided with windings connected to a commutator, somewhat similar to the armature of a direct current dynamo electric machine, whilst ordinarily four brushes are arranged to make contact with the commutator of which two, usually diametrically opposite each other, are used for the primary circuit and two others, which may be diametrically opposite each other in a different radial plane, are used for the secondary circuit or circuits. The rotor is rotated at constant speed. The primary current flowing in the rotor windings sets up a primary flux which is fixed in direction and may be said to be cut by the rotor conductors in which a voltage is thereby induced and a constant secondary current can be obtained in the secondary circuit or circuits at variable voltage. A stator may be provided which affords a return path of low magnetic reluctance for the fluxes which are set up by the rotor currents. The stator can be furnished with windings by which various magnetic fluxes can be obtained, which combine with or modify the magnetic fluxes due to the primary and secondary currents circulating in the rotor and thereby regulate the electromechanical performance of the machine. Such stator windings may include a winding, known as a "variator" winding, which is arranged to produce a flux co-axial with the flux resulting from the currents flowing in the armature between the secondary or the primary brushes. In the former case by adjustment of the strength of the field due to said variator winding, the secondary current flowing from the metadyne transformer to the consumption or load circuit or circuits may be adjusted. The elementary metadyne transformer above indicated may be modified and elaborated in many ways under the same general theory of operation. In the case of a generator the stator is furnished with variator windings included in the primary circuit or supplied with current from a separate source, which set up a magnetic flux in the same direction as that set up by the primary current circulating in the rotor windings. It will be seen that with such a machine electric energy supplied to the secondary circuit is furnished partly by the source of current supplying the primary circuit and partly by the mechanical rotation of the rotor. In a metadyne transformer the energy in the secondary circuit is always obtained from the source of direct current supplied through the primary brushes, the mechanical power supplied to the metadyne shaft being only sufficient to maintain it rotating at constant speed and to overcome friction, windage and other mechanical losses.

According to the invention, in a system of power distribution wherein a plurality of electric generating units of a type supplying constant current are connected in series with each other and with consuming devices, additional electrical connections are provided between pairs of substantially equipotential points in the series circuit in such a way as to form closed circuits each including a part of the consuming devices and a number of the electric generating units capable of supplying the power of said part of the cosuming devices.

In a modification a substantial part of the excitation of each generating unit is supplied by a current proportional to a part of the load which it is intended should be supplied from that generating unit.

In order that the invention may be clearly understood it will now be described with reference to the accompanying drawings which are electrical diagrams illustrating various examples of how it may be carried out in practice.

Figure 2:
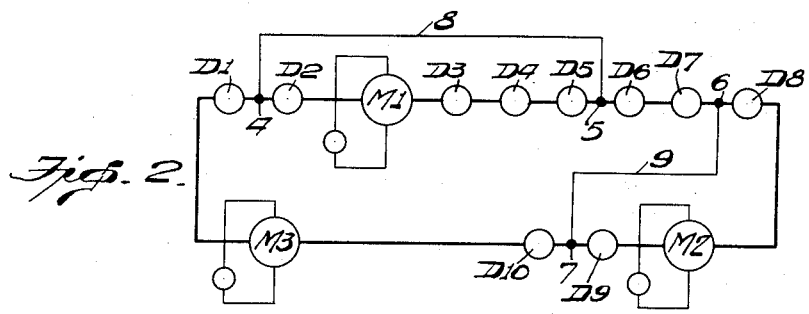
Figure 3:
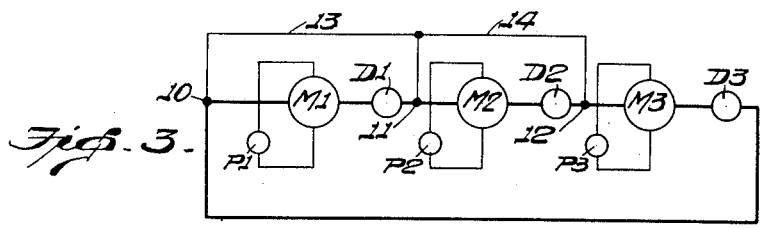
Figure 4:
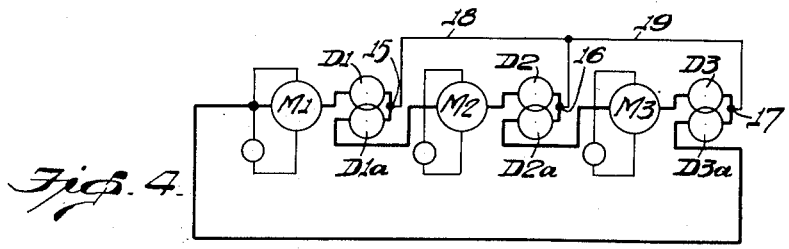
Figure 5:
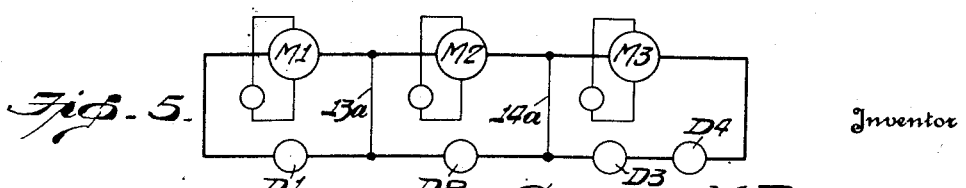
Figure 6:
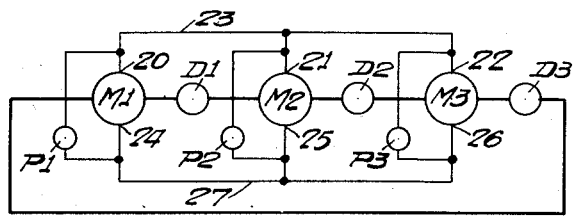
Figure 7:
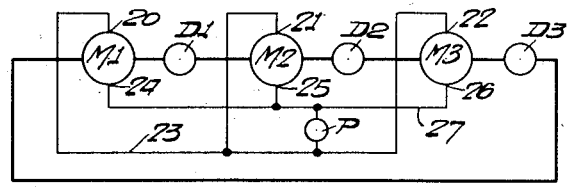
Figure 8:
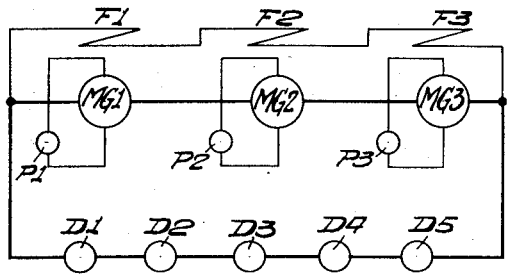
Figure 9:
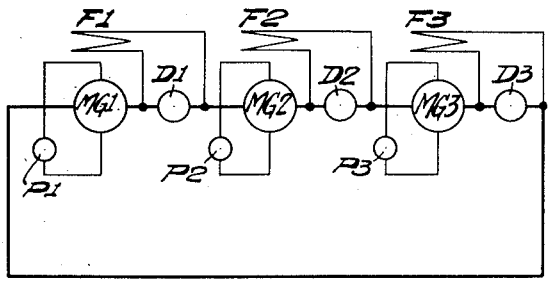
Figure 10:
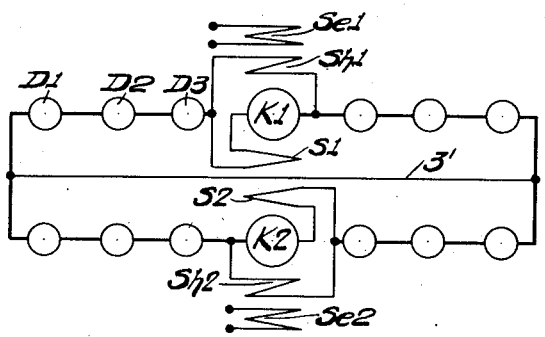
Figure 11:
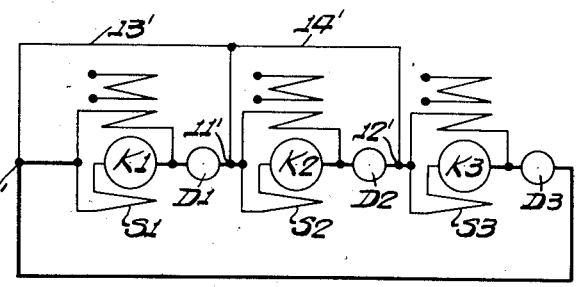
Figure 12:
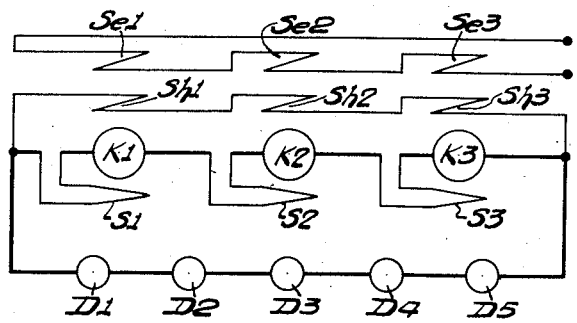
Figure 13:
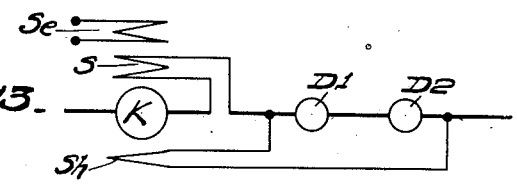

In the drawings, Fig. 1 illustrates an embodiment of my invention wherein two metadynes and a plurality of driving motors are connected in a series circuit with a low resistance interconnection between certain points in the series circuit for proportioning the voltage supplied by each metadyne; Fig. 2 illustrates another embodiment of my invention wherein a plurality of metadynes and loads are connected in series and voltage proportioning low resistance connectors are arranged to proportion the voltage supplied by each metadyne; Fig. 3 illustrates a modification of Fig. 2; Fig. 4 illustrates another embodiment of my invention wherein a plurality of metadynes supply power to twin motors and the neutral point between these twin motors are interconnected by low resistance conductors; Fig. 5 illustrates a plurality of metadynes in series with a plurality of motors and low resistance conductors connecting certain points in the system to proportion the voltage of each metadyne to its capacity; Fig. 6 illustrates a plurality of metadyne generating units in series with a plurality of driving motors and low resistance conductors connecting together the primary brushes of the metadynes; Fig. 7 illustrates a modification of Fig. 6 wherein a single source of primary voltage is connected across all of the interconnected primary brushes of the metadynes; Fig. 8 illustrates a series circuit wherein a plurality of metadynes are connected in series with a plurality of motors also connected in series with the metadynes and field exciting windings for the metadynes are connected in series across the series driving motors to control the secondary voltage of each of the metadynes; Fig. 9 illustrates a modification of Fig. 8 wherein the metadynes are connected in series with a load and field exciting windings are connected across each load and are arranged to control the respective secondary voltages of the metadynes to which the loads are directly connected; Fig. 10 is a modification of Fig. 1 wherein Kraemer type generators are employed in place of the metadynes; Fig. 11 is a modification of Fig. 3 wherein Kraemer type generators are used in place of the metadynes; Fig. 12 is a modification of Fig. 8 wherein Kraemer type generators are used in place of metadynes; and Fig. 13 is a modification of Fig. 9 wherein a Kraemer type generator is used in place of the metadyne.

Fig. 1 shows a series circuit comprising two metadyne transformers M1, M2, the primary current for which is supplied from the generators P1, P2, the consumption devices, for example electric motors forming the load, are indicated at D1, D2, D3, D4, D5, D6, D7, D8 and are connected in series circuit with the metadynes. Points 1 and 2 of the circuit are connected together by a conductor 3 so that two closed circuits are formed, each including one of the metadyne transformers and a number of motors which said transformer is capable of supplying. The metadynes in this diagram are assumed to be of the same capacity and each is indicated as supplying four of the motors.

In Fig. 2 a similar arrangement is shown in which three metadyne transformers M1, M2, M3 are connected in series with ten motors numbered D1 to D10. The motors are assumed to be all of equal size and the metadynes M1 and M3 are each assumed to be capable of supplying four of the motors and the metadyne M2 to be capable of supplying only two of the motors. Points 4, 5 and 6, 7 are joined together by conductors 8 and 9 respectively so that closed circuits are formed in which each metadyne is included with its appropriate number of motors.

In Fig. 3 three metadynes M1, M2, M3 are interspersed with motors D1, D2, D3 and each metadyne is assumed to be capable of supplying the requirements of the adjacent motor. The points 10, 11, 12 which are connected by the additional conductors 13, 14 are located between a motor forming a part of the load and an adjacent metadyne. The particular disposition shown reduces the peak of voltage along the main secondary circuit, the voltage rising up through one of the machines and dropping through the following machine. In some cases one of the points 10, 11 or 12 may be connected to the earth which will fix the point of lowest voltage in the system.

It is sometimes possible to fix for each set of consuming devices a point the potential of which is the mean value of the extreme potentials of the set of consuming devices, or at least some value near such mean value. Fig. 4, for example, shows a circuit in which three metadynes M1, M2, M3 are connected with consumption devices which are indicated as being twin motors D1 and D1a, D2 and D2a, and D3, D3a. What may be assumed to be neutral or equipotential points are located at the common terminals of the twin motors and these points indicated at 15, 16, 17 may be connected together by the conductors 18 and 19 in the same manner as the points 10, 11, 12 of Fig. 3. As an example, in Fig. 5 the three metadynes M1, M2, M3 are located adjacent each other in the series circuit and four motors D1, D2, D3, D4 are also located adjacent each other. The metadynes M1, M2 are assumed to be capable of supplying the power required by the motors D1, D2 respectively and the metadyne M3 of supplying the requirements of the motors D3 and D4. The additional conductors 13a and 14a are connected to points between the metadynes M1, M2 and M2, M3 and between the motors D1, D2 and D2, D3 respectively.

Where an odd number of generating devices is provided interspersed with consuming devices, all of said devices being connected in series, the neutral points in the rotor windings of the generating devices intermediate in voltage between the secondary brushes or points which differ in voltage by a constant quantity from said points may be connected together. For example, one of the primary brushes in each generating device indicated at M1, M2, M3 may be connected to the corresponding primary brushes in all the other generating devices. This is shown in the diagram Fig. 6, where the primary brushes 20, 21, 22 of the metadynes M1, M2, M3 are connected together by the conductor 23 and also the other primary brushes 24, 25, 26 are connected together by the conductor 27. In such a case the generators P1, P2, P3 of the respective metadynes M1, M2, M3 which supply the primary currents to the metadynes may be replaced by a single generator as shown in Fig. 7.

In the diagram hitherto described the metadynes are indicated as being metadyne transformers in which the energy supplied to the consuming devices through the secondary brushes of the metadyne is obtained from dynamo electric generators indicated at P1, P2, etc. connected to the primary brushes. The arrangements can be employed when metadyne generators are used, in which case windings are provided on the stator adapted to provide magnetic fluxes in line with the primary brushes of the metadyne, and the generators P1, P2, etc. may in such cases supply only a part of the energy required for the consuming devices, or even no energy at all, but only maintain a constant voltage at the primary brushes.

In the diagram Fig. 8 three metadyne generators are indicated at MG1, MG2, MG3 included in a series circuit with consumption devices D1, D2, D3, D4, and D5. The field windings of the generators which excite a magnetic flux in line with the primary brushes are indicated at F1, F2, F3. These field windings are connected in series and as a shunt to the secondary or consumption circuit in which the consumption devices D1, D2, D3, D4, and D5 are located. As the current in the windings F1, F2, F3 controls nearly completely the secondary voltage induced in each metadyne practically the same secondary voltage or secondary voltages bearing a constant ratio will be obtained from all the metadynes MG1, MG2, MG3 in the series.

Another arrangement in which the metadyne generators are located alternately with consumption devices is shown in Fig. 9, where the metadyne generators MG1, MG2, MG3 are located alternately with consuming devices indicated at D1, D2, D3. The exciting winding F1 of the metadyne generator MG1 is excited from the terminals of the consuming device D1 and the exciting windings F2, F3 of the metadyne generators MG2 and MG3 are respectively connected to the terminals of the adjacent consuming devices D2 and D3. By this means the power output of each metadyne, or the voltage produced at the secondary brushes, will be proportional to the power output of that part of the load which is associated therewith.

It will be obvious that the consuming device intended to be supplied from any particular metadyne need not be located adjacent thereto, as any part of the whole load may be associated with any metadyne whatever the sequence of connections and the terminals of the field winding and the exciting winding of the metadyne may be connected across the part of the load associated with said metadyne whatever may be the position of this part of the load in the entire circuit.

The invention is applicable where types of constant current supply devices other than metadyne generators and transformers are employed. For example, as shown in Fig. 10, a circuit similar to that shown in Fig. 1 is illustrated, but constant current dynamo electric machines of what may be termed the Kraemer type are employed instead of metadyne transformers. In the figure the armatures of the dynamo electric machines are indicated at K1, K2, the series opposing field windings of the machines at S1, S2, the shunt field windings of the machines at Sh1, Sh2, and the separately excited field windings which give a constant excitation at Se1, Se2. The consumption devices are indicated at D1, D2, etc. as before, and the additional conductor is shown at 3′.

In Fig. 11 an arrangement with Kraemer type dynamos is shown somewhat similar to the arrangement illustrated in Fig. 3. The armatures and field windings of the dynamos are indicated by the same references as in Fig. 10 and the additional conductors 13′, 14′, are connected to the points 10′, 11′, and 12′ as shown.

Fig. 12 shows an arrangement with Kraemer type dynamo generators corresponding to Fig. 8, the armatures K1, K2, K3 and series field windings S1, S2, S3 are connected in series as shown, the shunt field windings Sh1, Sh2, Sh3 are connected to the terminals of the series consuming devices D1, D2, D3, D4, D5, while the separately excited field windings Se1, Se2, Se3 are connected in series to a suitable source of supply not shown.

Fig. 13 shows a portion of a circuit in which a dynamo of the Kraemer type is employed in a manner similar to that shown for a metadyne transformer in Fig. 9. In this arrangement the series opposing field winding S and the separately excited field winding Se are connected in series with the armature and to a suitable source of supply in the usual manner. The shunt field winding Sh is, however, connected to the terminals of the consuming devices D1, D2, which the dynamo is particularly intended to supply.

The arrangements shown in Figs. 6 and 7 of the drawings applied with metadyne transformers or generators can only be employed where a connection can be readily made to a neutral point or a point having a potential intermediate between those of the brushes of the machine. This arrangement, therefore, cannot be employed with constant current generators of the Kraemer type for example.

I claim as my invention:—

1. A power system including a plurality of constant current electrical power generating units, an electrical load, means for connecting said generating units and said electrical load in series circuit relation, and means for proportioning the voltage supplied by each of said generating units in accordance with variations in said load in the proportion of the power generating capacity of each of said generating units to the power generating capacity of all of said units.

2. A power system including a plurality of constant current electrical power generating units, an electrical load, means for connecting said generating units and said electrical load in series circuit relation, and means of substantially negligible resistance directly interconnecting certain points of said system for distributing said electrical load among said generating units and for proportioning the voltage of each of said generating units in accordance with variations in said load in the relation of the power generating capacity of the respective unit to the power generating capacity of all of said units.

3. A power system including a plurality of constant current electrical power generating units, an electrical load, means for connecting said generating units and said electrical load in series circuit relation, and means of substantially negligible resistance directly interconnecting certain points in said series circuit and providing a plurality of closed loop circuits for proportioning the voltage of each of said generating units in accordance with variations in said load in the ratio of the power generating capacity of each of said units to the power generating capacity of all of said units, each of said loop circuits including an electrical generating unit and a portion of said load.

4. A power system including a plurality of constant current electrical power generating units, an electrical load, means for connecting said generating units and said electrical load in a series circuit, a field exciting winding for each of said power generating units, and means varying the excitation of each of said field exciting windings in accordance with variations in said load for maintaining the voltage of each of said generating units in a predetermined relation with respect to the ratio of the power generating capacity of the respective generating unit to the power generating capacity of all of said units.

5. An electrical power system including a plurality of constant current electrical power generating units, an electrical load, means for connecting said generating units and said electrical load in series circuit relation, said electrical load being interspersed with respect to said generating units, and means of substantially negligible resistance directly interconnecting certain points in the series circuit for providing a plurality of closed circuits.

6. An electrical power system including a plurality of constant current electrical power generating units, an electrical load, means for connecting said generating units and said electrical load in series circuit relation, said electrical load being interspersed with respect to said generating units, and means of substantially negligible resistance directly interconnecting certain points in said load circuit for providing a plurality of closed loops, each of said loops including an electrical generating unit and a portion of said load.

7. An electrical power system including a plurality of constant current electrical power generating units, an electrical load, means for connecting said generating units and said electrical load in series circuit relation, and means of substantially negligible resistance directly connecting certain points in said series circuit for providing closed circuits, each of said closed circuits including an electrical generating unit and a portion of said electrical load.

8. An electrical power system including a plurality of constant current electrical power generating units, an electrical load, means for connecting said generating units and said electrical load in series circuit relation, said electrical load being interspersed with respect to said generating units, and means of substantially negligible resistance directly interconnecting certain points of said generating units.

9. A power system including a plurality of constant current electrical power generating units, an electrical load, means for connecting said generating units and said electrical load in series circuit relation, a field exciting winding for each of said generating units, means dependent upon said electrical load for varying the energization of said field exciting windings in accordance with variations in said load, and means cooperating with said energization varying means and directly interconnecting certain points in said system for proportioning the power generated by each of said generating units in a predetermined relation with respect to the ratio of the power generating capacity of the respective generating unit to the power generating capacity of all of said units.

10. A power system including a plurality of metadyne generators, each of said metadyne generators having an armature, a primary brush set and a secondary brush set associated with each of said armatures for providing a primary circuit and a secondary circuit therethrough, said secondary brush set being electrically displaced from said primary brush set, an electrical load, means for connecting said electrical load and said secondary brush sets in series circuit relation, and means arranged to control the voltage across said primary circuit of each of said metadyne generators for equalizing the distribution of said electrical load between said metadyne generators.

11. A power system including a plurality of metadyne generators, each of said metadyne generators having an armature, a primary brush set and a secondary brush set associated with each of said armatures for providing a primary circuit and a secondary circuit therethrough, said secondary brush set being electrically displaced from said primary brush set, an electrical load, means for connecting said electrical load and said secondary brush sets in series circuit relation, a source of electrical power supply, and means connecting said primary brush sets in multiple and across said source of electrical power supply for equalizing the distribution of said electrical load between said metadyne generators.

12. A power system including a plurality of metadyne generators, each of said metadyne generators having an armature, a primary brush set and a secondary brush set associated with each of said armatures for providing a primary circuit and a secondary circuit therethrough, said secondary brush set being electrically displaced from said primary brush set, an electrical load, means for connecting a part of said electrical load in series with each of said secondary brush sets of said metadyne generators, a source of electrical power supply, and means connecting said primary brush sets of said metadyne generators in multiple and across said source of electrical power supply for equalizing the distribution of said electrical load between said metadyne generators.

13. A power system including a plurality of constant current electrical power generating units, an electrical load, means for connecting said generating units and said electrical load in series circuit relation, a field exciting winding for each of said generating units, and means connecting said generating unit field exciting windings in series circuit relation for equalizing the distribution of said electrical load between said generating units.

14. A power system including a plurality of metadyne generators, each of said metadyne generators having an armature, a primary brush set and a secondary brush set associated with each of said armatures for providing a primary circuit and a secondary circuit therethrough, said secondary brush set being electrically displaced from said primary brush set, an electrical load, means for connecting said electrical load and said secondary brush sets in series circuit relation, and means arranged to control the voltage across said secondary circuit of each of said metadyne generators for equalizing the distribution of said electrical load between said metadyne generators.

15. A power system including a plurality of metadyne generators, each of said metadyne generators having an armature, a primary brush set and a secondary brush set associated with each of said armatures for providing a primary circuit and a secondary circuit therethrough, said secondary brush set being electrically displaced from said primary brush set, an electrical load, means for connecting said electrical load and said secondary brush sets in series circuit relation, a field exciting winding for each of said metadyne generators arranged to produce a component of magnetic excitation along the primary commutating axis of each of said metadyne generators, and means connecting said field exciting windings in series circuit relation for equalizing the distribution of said electrical load between said metadyne generators.

GIUSEPPE M. PESTARINI.